US009467597B2

(12) United States Patent
Yoshida

(10) Patent No.: US 9,467,597 B2
(45) Date of Patent: Oct. 11, 2016

(54) IMAGE READING DEVICE, IMAGE FORMING APPARATUS, AND RECORDING MEDIUM

(71) Applicant: KYOCERA DOCUMENT SOLUTIONS INC., Osaka (JP)

(72) Inventor: Masaya Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/286,207

(22) Filed: May 23, 2014

(65) Prior Publication Data
US 2014/0355082 A1 Dec. 4, 2014

(30) Foreign Application Priority Data

May 31, 2013 (JP) .................... 2013-115978

(51) Int. Cl.
H04N 1/04 (2006.01)
H04N 1/407 (2006.01)

(52) U.S. Cl.
CPC .................... H04N 1/4076 (2013.01)

(58) Field of Classification Search
CPC ................................. H04N 1/4076
USPC ...... 358/461, 497, 474, 486, 1.19, 475, 493, 358/406, 504, 465; 382/274, 275
See application file for complete search history.

(56) References Cited

U.S. PATENT DOCUMENTS

| 4,602,293 | A | * | 7/1986 | Sekine | H04N 1/401 358/461 |
| 5,130,807 | A | * | 7/1992 | Tanabe | H04N 1/0057 355/75 |
| 6,025,933 | A | * | 2/2000 | Ohashi | H04N 1/40056 358/446 |
| 7,755,804 | B2 | | 7/2010 | Ikeno et al. | |
| 2006/0245015 | A1 | | 11/2006 | Ikeno et al. | |
| 2011/0085213 | A1 | * | 4/2011 | Kim | H04N 1/4076 358/475 |
| 2012/0307322 | A1 | * | 12/2012 | Ozawa et al. | 358/475 |
| 2013/0010338 | A1 | * | 1/2013 | Tanaka et al. | 358/475 |
| 2014/0043629 | A1 | * | 2/2014 | Shirado | 358/1.9 |

FOREIGN PATENT DOCUMENTS

| JP | S64-064484 | A | | 3/1989 |
| JP | 08084221 | A | * | 3/1996 |
| JP | H10-200689 | A | | 7/1998 |
| JP | H11-275310 | A | | 10/1999 |
| JP | 2000-013808 | A | | 1/2000 |
| JP | 2001-169054 | A | | 6/2001 |

(Continued)

OTHER PUBLICATIONS

An Office Action; "Notice of Reasons for Rejection," issued by the Japanese Patent Office on Aug. 4, 2015, which corresponds to Japanese Patent Application No. 2013-115978 and is related to U.S. Appl. No. 14/286,207.

(Continued)

Primary Examiner — Cheukfan Lee
(74) Attorney, Agent, or Firm — Studebaker & Brackett PC

(57) ABSTRACT

An image reading device reads an image of an object. The image reading device includes a white reference member and a gloss reference member. The white reference member is used for generating white reference data. The gloss reference member has a larger ratio of mirror reflected light to incident light than the white reference member.

14 Claims, 8 Drawing Sheets

(56) References Cited

FOREIGN PATENT DOCUMENTS

| | | |
|---|---|---|
| JP | 2003-319134 A | 11/2003 |
| JP | 2006-311289 A | 11/2006 |
| JP | 2010-135920 A | 6/2010 |
| JP | 2010-187221 A | 8/2010 |

OTHER PUBLICATIONS

An Office Action; "Decision for Refusal," issued by the Japanese Patent Office on Mar. 1, 2016, which corresponds to Japanese Patent Application No. 2013-115978 and is related to U.S. Appl. No. 14/286,207.

* cited by examiner

IMAGE READING DEVICE, IMAGE FORMING APPARATUS, AND RECORDING MEDIUM

INCORPORATION BY REFERENCE

The present application claims priority under 35 U.S.C. §119 to Japanese Patent Application No. 2013-115978, filed May 31, 2013. The contents of this application are incorporated herein by reference in their entirety.

BACKGROUND

The present disclosure relates to an image reading device for reading an image of an object, an image forming apparatus, and a recording medium.

A user may use an image reading device for reading not only an image on paper but also a three-dimensional object including a glossy portion (hereinafter referred to as the "glossy object"). The glossy object is, for example, a cash card (having a portion of carved letters or a portion coated in silver or gold), clothing (having buttons or a decorated portion), and jewelry.

When a glossy object is read by an image reading device, strong light mirror reflected on the glossy object enters an image sensor (a photoelectric conversion element). Accordingly, in an image reading device in which the light amount of a light source is adjusted for reading an image on paper, an image sensor receives light having an amount beyond the saturation light exposure of the image sensor. This results in charge exceeding a charge capacity storable in one pixel of the image sensor, and hence the charge overflows to an adjacent pixel, which causes an abnormality in the read image of the glossy object.

In an image reading device disclosed in Patent Document 1, if an image signal at a level beyond a precedently set value is output from an image sensor while reading a glossy object after reading a white reference plate, charge storage time for each pixel of the image sensor is shortened. With the charge storage time thus shortened, the white reference plate is read again, and the glossy object is then read again. As a result, the overflow of the charge in each pixel of the image sensor can be suppressed in this image reading device.

SUMMARY

An image reading device according to a first aspect of the present disclosure reads an image of an object. The image reading device includes a white reference member and a gloss reference member. The white reference member is used for generating white reference data. The gloss reference member has a larger ratio of mirror reflected light to incident light than the white reference member.

An image forming apparatus according to a second aspect of the present disclosure includes an image reading device according to the first aspect of the present disclosure and an image forming section. The image forming section forms the image of the object.

A non-transitory computer-readable recording medium according to a third aspect of the present disclosure records a computer program for generating an image of an object. The computer program causes a computer to execute: causing an image sensor to image a gloss reference member irradiated with light irradiated from a light source; and controlling a light amount of the light source on the basis of an imaging signal obtained by the image sensor. The gloss reference member has a larger ratio of mirror reflected light to incident light than a white reference member used for generating white reference data.

DETAILED DESCRIPTION

Figure 1:
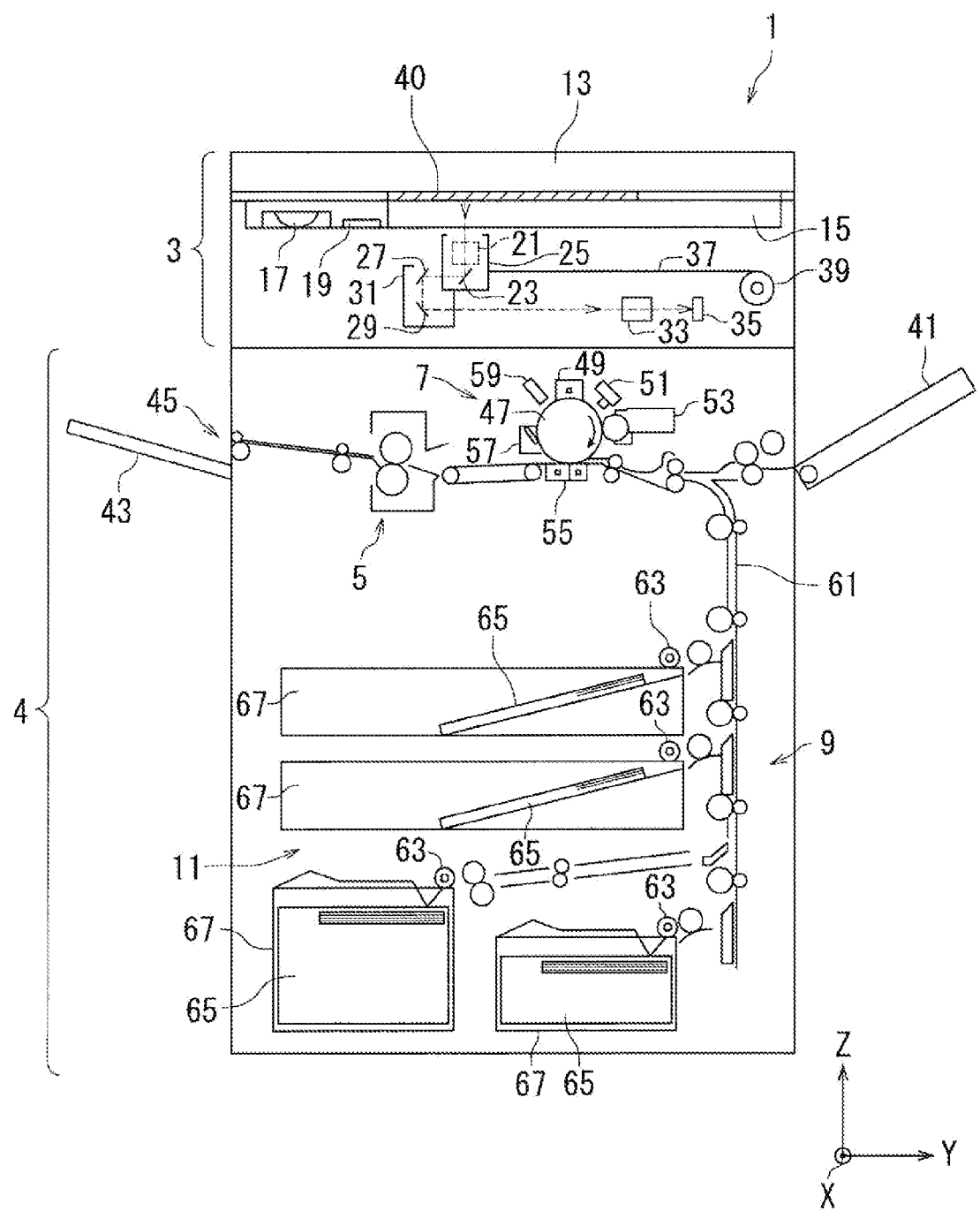
FIG. 1 is a diagram schematically illustrating the configuration of an image forming apparatus including an image reading device according to an embodiment of the present disclosure.

One suitable embodiment of the present disclosure will now be described with reference to the accompanying drawings. It is noted that like reference numerals are used in these drawings to refer to like elements so as to avoid redundant description.

[Configuration of Image Forming Apparatus]

FIG. 1 is a diagram schematically illustrating the configuration of an image forming apparatus 1 including an image reading device 3 according to the embodiment of the present disclosure. The image forming apparatus 1 is a copying machine in the present embodiment. The image forming apparatus 1 includes the image reading device 3 and a printing device 4. The printing device 4 includes a fixing section 5, an image forming section 7, a paper conveyance section 9, and a paper feed section 11. The paper feed section 11 is provided in a lower portion of the image forming apparatus 1. The paper conveyance section 9 is provided on a side of the paper feed section 11. The image forming section 7 is provided above the paper feed section 9. The fixing section 5 is provided downstream from the image forming section 7 in a paper conveying direction. The image reading device 3 is provided above the image forming section 7 and the fixing section 5.

The image reading device 3 includes an object cover 13, a contact glass 15, a gloss reference member 17, and a white reference member 19. The image reading device 3 further includes, below the contact glass 15, the gloss reference member 17, and the white reference member 19, a light source 21, a mirror 23, a carriage 25, a mirror 27, a mirror 29, a carriage 31, a lens 33, an image sensor 35, a plurality of wires 37 (merely one of which is illustrated in FIG. 1 for convenience), and a drum 39.

The image reading device 3 reads an image of an object 40 loaded on the contact glass 15, and generates image data of the object 40. The object 40 is an object to be read by the image reading device 3, and includes not only paper of an original document but also a glossy object (namely, a three-dimensional object having a glossy portion) and a three-dimensional object other than a glossy object. Now, the image reading device 3 will be described in detail.

First, the gloss reference member 17 will be described. The gloss reference member 17 has a larger ratio of mirror reflected light (specular reflected light) to incident light than the white reference member 19. Mirror reflection means reflection of light according to the law of reflection like reflection on a mirror surface. On the contrary, diffuse reflection means diffusive reflection of light excluding the mirror reflection. Accordingly, reflected light includes mirror reflected light and diffuse reflected light. A ratio of the mirror reflected light to incident light is expressed by, for example, mirror reflectivity or specular glossiness. The mirror reflectivity refers to a ratio of a reflected flux to an incident flux in the mirror reflection, namely, a ratio of a reflected luminous flux to an incident luminous flux in the mirror reflection (JIS Z 8741). The specular glossiness refers to a ratio between a luminous flux reflected from an object in a mirror surface direction at specific angles of a light source and a photo detector and a luminous flux reflected from glass with a prescribed refractive index (of, for example 1.567) in the mirror surface direction (JIS K 5600-4-7).

In the present embodiment, the image reading device 3 has an ordinary reading mode and a glossy object reading mode. The ordinary reading mode is selected for reading an original document or a three-dimensional object other than a glossy object. The glossy object reading mode is selected for reading a glossy object.

When the glossy object reading mode is selected, the image reading device 3 reads an image of a gloss reference member 17, and controls the amount of light irradiated from the light source 21 on the basis of the read image. The image reading device 3 irradiates the white reference member 19 with the light from the light source 21 having an amount thus controlled, so as to generate white reference data. Besides, the image reading device 3 acquires black reference data with the light source 21 turned off. Thereafter, the image reading device 3 reads an image of the object 40 (such as a glossy object) by allowing the light source 21 to irradiate the object 40 with the light having the controlled amount.

In this manner, in the present embodiment, the image reading device 3 includes the gloss reference member 17 having a larger ratio of mirror reflected light to incident light than the white reference member 19. Before reading an image of the object 40 (such as a glossy object), the light source 21 emits light to irradiate the gloss reference member 17. Accordingly, on the basis of reflected light from the gloss reference member 17, the light amount of the light source 21 employed for reading the image of the object 40 can be controlled. As a result, without repeatedly performing the operation for reading an object, the overflow of charge from each pixel (each light receiving element) of the image sensor 35 can be suppressed as well as lowering of the work efficiency of a user can be suppressed.

Next, the white reference member 19 will be described. In the present embodiment, the white reference member 19 is a white reference plate. The white reference member 19 extends along a main scanning direction. The white reference member 19 is a member used for generating white reference data for shading correction. Through the shading correction, ununiformity in sensitivity among the pixels (the light receiving elements) of the image sensor 35, ununiformity in the amount of light irradiating the object 40, and ununiformity in imaging performed by the lens 33 provided for imaging reflected light are corrected on the basis of white reference data and black reference data.

Here, the main scanning direction is a direction along the X-axis vertical to the Y-axis and the Z-axis. A sub scanning direction is a direction along a positive direction of the Y-axis. In the present embodiment, the direction along the Z-axis corresponds to the vertical direction, and the direction along the Y-axis and the direction along the X-axis are directions along a horizontal plane.

Next, a portion ranging from the object cover 13 to the optical system will be described. The object cover 13 is provided on the uppermost surface of the image forming apparatus 1. The object cover 13 is openable/closable. A user opens the object cover 13 and loads the object 40 on the contact glass 15. Then, the user closes the object cover 13 so as to hold the object 40 with the object cover 13.

The configuration of the optical system will be described. The light source 21 and the mirror 23 are attached on the carriage 25. Each of the light source 21 and the mirror 23 extends along the main scanning direction. The light source 21 and the mirror 23 are arranged in the direction along the Z-axis. The light source 21 is disposed above the mirror 23. The mirror 27 and the mirror 29 are attached on the carriage 31. Each of the mirror 27 and the mirror 29 extends along the main scanning direction.

One end of each of the plural wires 37 is attached to the carriage 25 and the carriage 31. The other end of each of the plural wires 37 is connected to the drum 39. The drum 39 is normally/reversely rotated by a driving source of a stepping motor. As a result, the carriage 25 and the carriage 31 are freely movable along the sub scanning direction.

An optical path in the optical system will be described. The light source 21 irradiates the object 40 with light through the contact glass 15. In the present embodiment, the light source 21 is a white light source. The light irradiated from the light source 21 is reflected on the object 40. The reflected light is directed to the lens 33 by the mirror 23, the mirror 27, and the mirror 29. The lens 33 collects the reflected light to input the collected light to the image sensor 35. The image sensor 35 is a photoelectric converter for converting the input reflected light into an analog electric signal. In other words, the image sensor 35 images the object 40 by using the light irradiated from the light source 21 and reflected on the object 40. In the present embodiment, the image sensor 35 is a CCD (Charge Coupled Device).

Scanning performed in the optical system will be described. The image sensor 35 includes a plurality of pixels (a plurality of light receiving elements) arranged in the form of a line along the main scanning direction. Besides, the light source 21 extends linearly along the main scanning direction. Accordingly, the image sensor 35 images the object 40 on a line basis along the main scanning direction. The light source 21 irradiates the object 40 with light while moving from its home position in the sub scanning direction in accordance with the rotation of the drum 39, and therefore, the image sensor 35 repeatedly and continuously performs a line-based reading operation along the sub scanning direction for imaging the whole object 40. The home position of the light source 21 is a position below the white reference member 19 in the present embodiment.

Here, the reflected light from the object 40 is subjected to color separation by a color filter (not shown) before entering the image sensor 35. In the present embodiment, the reflected light is separated into a plurality of different color components. In the present embodiment, the reflected light is separated into the three primary colors of light (i.e., R (red), G (green) and B (blue)). Accordingly, the image sensor 35 includes a plurality of pixels (a plurality of light receiving elements) for each color of RGB. In the present embodiment, a set of one pixel corresponding to R, one pixel corresponding to G and one pixel corresponding to B is regarded as one pixel. In other words, one pixel includes an R component, a G component, and a B component.

The image reading device 3 has been described so far. Next, the printing device 4 will be described. The paper feed section 11 includes a plurality of paper feed cassettes 67 and a manual feed tray 41. Each of the paper feed cassettes 67 holds paper 65 used as a recording medium. The manual feed tray 41 supplies manually fed paper. Owing to the rotation of a paper feed roller 63, the paper 65 is fed one by one from a selected one of the paper feed cassettes 67 to the paper conveyance section 9. On the manual feed tray 41, a recording medium such as paper different in size from those held in the paper feed cassettes 67, an envelope, or an OHP sheet is loaded. The manual feed tray 41 feeds the recording medium loaded thereon to the paper conveyance section 9.

The paper 65 fed to the paper conveyance section 9 is conveyed through a paper conveyance path 61 to the image forming section 7. The image forming section 7 forms an image of the object 40. Specifically, the following operation is performed. The image forming section 7 forms a toner image on the paper 65 by the electrophotographic process. Therefore, the image forming section 7 includes a rotatably supported photoconductive member 47, a charging part 49, an exposing part 51, a developing part 53, a transferring part 55, a cleaning part 57, and a charge removing part 59. The charging part 49, the exposing part 51, the developing part 53, the transferring part 55, the cleaning part 57, and the charge removing part 59 are disposed around the photoconductive member 47.

The charging part 49 includes a charging wire to which a high voltage is applied. When a prescribed potential is applied to the surface of the photoconductive member 47 by corona discharge from the charging wire, the surface of the photoconductive member 47 is uniformly charged. Then, light based on the image data of the object 40 having been read by the image reading device 3 is irradiated by the exposing part 51 onto the surface of the photoconductive member 47, and the potential on the surface of the photoconductive member 47 is selectively attenuated, resulting in forming an electrostatic latent image on the surface of the photoconductive member 47.

Subsequently, the developing part 53 develops the electrostatic latent image on the surface of the photoconductive member 47 to form a toner image on the surface of the photoconductive member 47. When the paper 65 is supplied to a portion between the photoconductive member 47 and the transferring part 55, the transferring part 55 transfers the toner image onto the paper 65.

The paper 65 having the toner image transferred thereon is conveyed toward the fixing section 5. In the fixing section 5, the paper 65 is heated and pressed, so as to fuse and fix the toner image on the paper 65. Thereafter, the paper 65 having the toner image fixed thereon is ejected by an exit roller pair 45 onto an exit tray 43.

After transferring the toner image onto the paper 65 by the transferring part 55, the toner remaining on the surface of the photoconductive member 47 is removed by the cleaning part 57. Besides, charge remaining on the surface of the photoconductive member 47 is removed by the charge removing part 59. Then, the surface of the photoconductive member 47 is charged by the charging part 49 again so as to similarly perform the image formation thereafter.

[Details of Gloss Reference Member and Light Source]

Figure 2:
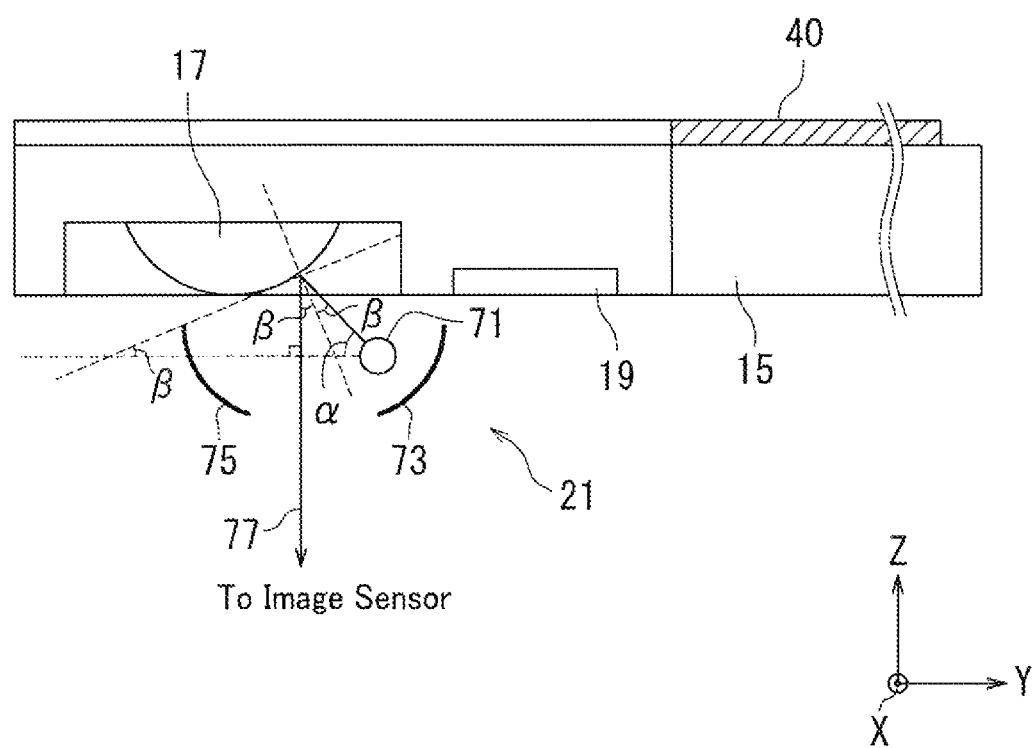
FIG. 2 is an explanatory diagram of a gloss reference member and a light source of the image reading device according to the embodiment of the present disclosure.

FIG. 2 is an explanatory diagram of the gloss reference member 17 and the light source 21. The gloss reference member 17 is formed as a part of a spherical shape smaller than a hemisphere. Besides, the gloss reference member 17 is in a shape curved downward in the vertical direction. The gloss reference member 17 has a surface for mirror reflecting incident light from a light emitting part 71 of the light source 21 along a normal direction (in the vertical direction in the present embodiment) to the surface on which the object 40 is loaded, namely, the surface of the contact glass 15, depending on the position of the light emitting part 71. Accordingly, reflected light 77 mirror reflected by the gloss reference member 17 passes between a reflecting member 73 and a reflecting member 75, is reflected on the mirror 23, the mirror 27, and the mirror 29 illustrated in FIG. 1, and enters the image sensor 35 through the lens 33.

It is herein assumed that an irradiation angle, against the horizontal line, of light from the light emitting part 71 to the gloss reference member 17 is an angle $\alpha$. Since the reflected light 77 is mirror reflected, an incident angle $\beta$ of the light from the light emitting part 71 to the gloss reference member 17 accords with a reflection angle $\beta$ of the reflected light 77. Assuming that the unit of the angles is "degree", $\beta=(90-\alpha)/2$.

The gloss reference member 17 is formed to have a larger ratio of the mirror reflected light to the incident light than the white reference member 19 by, for example, polishing a metal or plating a synthetic resin or glass. In order to cope with reading a large number of glossy objects having a larger ratio of mirror reflected light to incident light, the ratio of the mirror reflected light to the incident light of the gloss reference member 17 is preferably as large as possible. Incidentally, the gloss reference member 17 may be hollow or may include another structure.

Next, the light source 21 will be described. The light source 21 includes the light emitting part 71, the reflecting member 73, and the reflecting member 75. The positional relationship among the light emitting part 71, the reflecting member 73, and the reflecting member 75 is secured. Accordingly, the light emitting part 71, the reflecting member 73, and the reflecting member 75 are secured on the carriage 25 with their positional relationship secured, so as to move together with the carriage 25. Each of the light emitting part 71, the reflecting member 73, and the reflecting member 75 extends along the main scanning direction. Each of the reflecting member 73 and the reflecting member 75 is in a curved shape having an arc cross-section.

The light emitting part 71 is a lamp in the present embodiment. The lamp is, for example, a fluorescent tube or an LED (Light Emitting Diode). The light emitting part 71 emits light. The light emitting part 71 irradiates, with the light, the gloss reference member 17, the white reference member 19, or the object 40 in accordance with the position of the light source 21.

Each of the reflecting member 73 and the reflecting member 75 reflects the light emitted by the light emitting part 71. Each of the reflecting member 73 and the reflecting member 75 irradiates, with the reflected light, the gloss reference member 17, the white reference member 19, or the object 40 in accordance with the position of the light source 21. In accordance with the directions of the reflecting member 73 and the reflecting member 75, the irradiating direction of the light is set. The reflecting member 75 is provided to oppose the reflecting member 73. The reflecting member 75 reflects the light emitted by the light emitting part 71 to irradiate the gloss reference member 17 with the reflected light from a different direction from the light emitting part 71 and the reflecting member 73.

In the exemplary case of FIG. 2, the gloss reference member 17 has a surface for mirror reflecting, in the vertical direction, the light directly entering from the light emitting part 71 and the light entering from the reflecting member 73.

As described so far, according to the present embodiment, the gloss reference member 17 is in a curved shape. Accordingly, the surface for mirror reflecting the incident light in the vertical direction can be easily formed. Besides, the gloss reference member 17 is formed as a part of a spherical shape. Accordingly, as compared with the case where the gloss reference member 17 is formed as a sphere, the amount of member to be used can be reduced, cost can be lowered, and space can be saved.

Besides, the gloss reference member 17 has the surface for mirror reflecting the incident light in the vertical direction. Accordingly, the image sensor 35 can receive the reflected light 77 with high intensity from the gloss reference member 17, and hence, can control the light amount of the light source 21 on the basis of the reflected light 77 with high intensity. As a result, when the object 40 is a glossy object, the charge overflow from each pixel of the image sensor 35 can be effectively suppressed.

[Electrical Configuration of Image Reading Device]

Figure 3:
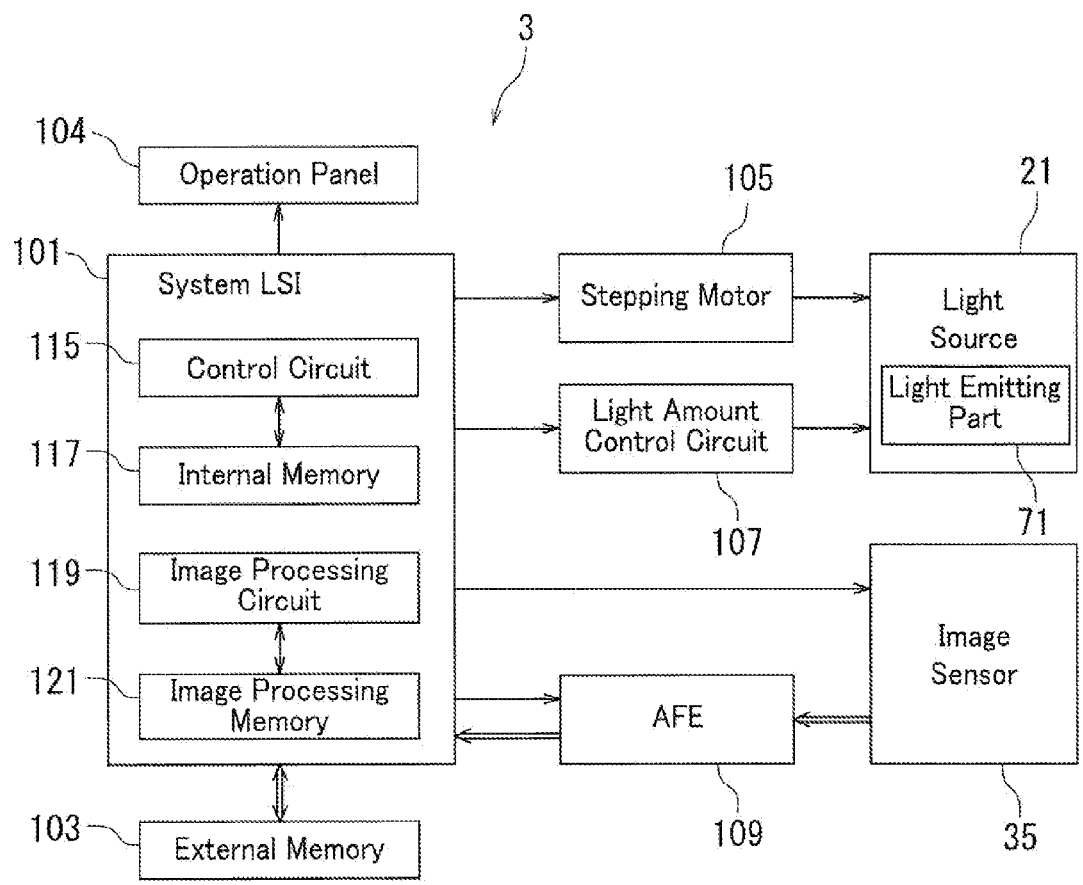
FIG. 3 is a block diagram schematically illustrating the electric configuration of the image reading device according to the embodiment of the present disclosure.

Now, the electrical configuration of the image reading device 3 will be described with reference to FIGS. 1 and 3. FIG. 3 is a block diagram schematically illustrating the electrical configuration of the image reading device 3. The image reading device 3 includes a system LSI (Large Scale Integration) 101, an external memory 103, a stepping motor 105, a light amount control circuit 107, the light source 21, an AFE (analog front end) 109, the image sensor 35, and an operation panel 104. The operation panel 104 displays the state of the image forming apparatus 1 and various messages, and accepts an input to the image forming apparatus 1 from a user. For example, a user operates the operation panel 104 to select either the ordinary reading mode or the glossy object reading mode. Incidentally, the operation panel 104 includes a driver and the like (not shown). The stepping motor 105 includes a driver and the like (not shown).

The system LSI 101 includes a control circuit 115 (a control unit), an internal memory 117, an image processing circuit 119 (an image processing unit), and an image processing memory 121. Each of the external memory 103, the internal memory 117, and the image processing memory 121 may include a semiconductor memory such as a RAM, a ROM, or a flash memory.

The control circuit 115 is a computer that executes a computer program stored in the external memory 103 or the internal memory 117 for controlling the operations of the image reading device 3 and the printing device 4. Incidentally, the internal memory 117 is used also as a work area, a data storage area or the like by the control circuit 115. Now, the control of the image reading device 3 by the control circuit 115 will be described.

The control circuit 115 executes a computer program stored in the external memory 103 or the internal memory 117 to control the operation panel 104, the stepping motor 105, the light amount control circuit 107, the image sensor 35, the AFE 109, and the image processing circuit 119.

First, description will be given on the assumption of a case where the glossy object reading mode is selected. The control circuit 115 reads the gloss reference member 17 to control the light amount of the light emitting part 71 of the light source 21. Specifically, the following operation is performed.

Before starting a reading operation, the light source 21 is in the home position. The control circuit 115 drives the stepping motor 105, so as to rotate the drum 39 and move the light source 21 in the opposite direction to the sub scanning direction. In parallel to the movement of the light source 21, the control circuit 115 controls the light amount control circuit 107 to cause the light source 21 to irradiate the gloss reference member 17 with light.

The light amount of the light emitting part 71 of the light source 21 is controlled, for example, as follows. In accordance with a light amount control parameter, the control circuit 115 causes the light amount control circuit 107 to control the light amount of the light emitting part 71. The light amount control parameter is a parameter used for controlling the amount of light emitted by the light emitting part 71. In the present embodiment, the light amount control parameter is a lighting period of the light emitting part 71. In other words, in the present embodiment, the control circuit 115 controls the light amount by controlling the lighting period of the light emitting part 71. As the lighting period of the light emitting part 71 is longer, the light amount is increased, and as the lighting period of the light emitting part 71 is shorter, the light amount is reduced.

The lighting period corresponding to the light amount control parameter refers to a period when the light emitting part 71 is turned on during a scanning period for each line along the main scanning direction. Accordingly, while moving in the sub scanning direction, the light emitting part 71 repeatedly emits light periodically during the lighting period corresponding to the light amount control parameter. Incidentally, for example, an initial value of the light amount control parameter is a light amount control parameter employed in the ordinary reading mode, or a light amount control parameter set in the preceding glossy object reading mode.

In this manner, the light amount is controlled on the basis of the light amount control parameter. Hereinafter, the light amount control parameter employed in the glossy object reading mode is designated as the "glossy object parameter". Next, in order to specifically describe a method for setting the glossy object parameter, the movement of the light source 21, the image sensor 35, the AFE 109, and the image processing circuit 119 will be described with reference to FIGS. 1 and 3, so as to define "pixel density data".

The light source 21 irradiates the gloss reference member 17 with the light while moving in the opposite direction to the sub scanning direction. In parallel to the movement of the light source 21, the image sensor 35 images the gloss reference member 17 by repeatedly and continuously performing a main scanning direction imaging operation on the gloss reference member 17 in the opposite direction to the sub scanning direction. In this manner, the image sensor 35 images the gloss reference member 17 by using the light reflected on the gloss reference member 17. After completing imaging the gloss reference member 17, the control circuit 115 controls the stepping motor 105 to return the light source 21 to the home position.

The image sensor 35 converts the reflected light from the gloss reference member 17 into an analog electric signal to output it to the AFE 109. The analog electric signal output by the image sensor 35 is herein designated as the "imaging signal". The imaging signal includes a plurality of pixel signals. Each of the plural pixel signals includes a plurality of color components. In the present embodiment, each of the plural pixel signals includes an R (red) component, a G (green) component, and a B (blue) component. Under control by the control circuit 115, the AFE 109 amplifies the imaging signal output by the image sensor 35, performs correction (such as offset correction) on the amplified signal, converts the corrected signal into a digital electric signal, and outputs it to the system LSI 101. The digital electric signal output by the AFE 109 is herein designated as the "imaging data". The imaging data includes a plurality of pixel data respectively corresponding to the plural pixel signals.

Under control by the control circuit 115, the image processing circuit 119 quantizes each pixel data of the imaging data output by the AFE 109 to generate image data and stores the generated image data in the internal memory 117. In the present embodiment, each of the RGB components is subjected to 8-bit quantization. Accordingly, in each pixel data included in the image data, each of the RGB components has a value of 0 to 255 and corresponds to a density (namely, brightness). Hereinafter, the quantized pixel data is defined as "pixel density data".

In the present embodiment, the pixel density data is defined as described above. Next, the method for setting a glossy object parameter based on the pixel density data will be specifically described.

The control circuit 115 acquires pixel density data corresponding to a peak value (maximum value) PV out of all the pixel density data included in the image data of the glossy reference member 17. The pixel density data has the RGB components. Accordingly, the control circuit 115 may acquire the peak value PV from all the pixel density data with an average of the RGB components regarded as each pixel density data. Alternatively, the control circuit 115 may acquire the peak value PV from all the pixel density data with each of the RGB components of each pixel density data regarded as each pixel density data.

The control circuit 115 sets a glossy object parameter so that the peak value PV can fall in a range of a specified density value (specified brightness value) D±x, and stores the set glossy object parameter in the internal memory 117. As a result, the glossy object parameter is set, for example, so that the light amount of the light emitting part 71 can be smaller than in the ordinary reading mode.

Incidentally, the specified density value D is provided with the range x for the following reason: Depending on the environment (such as the temperature and the state of a power supply), the pixel signal output by the image sensor 35 is varied, and therefore, the pixel density data is also varied. The range x may be set in consideration of such variation. The range x is experimentally and/or experientially determined in consideration of the variation of the pixel density data. For example, if the RGB components of the pixel density data are expressed by values of 0 to 255, the range x=5.

So far, the method for setting the glossy object parameter has been specifically described. Next, the white reference data, the black reference data, and image processing will be successively described with reference to FIGS. 1 and 3, and thereafter, an operation performed in the ordinary reading mode will be simply described.

After setting the glossy object parameter, the control circuit 115 reads the white reference member 19 with the light amount based on the glossy object parameter in the same manner as in reading the gloss reference member 17. The image processing circuit 119 generates the white reference data on the basis of the result of the reading operation, and stores the white reference data in the image processing memory 121. It is noted that the white reference data is generated with respect to each of the RGB components.

Next, the control circuit 115 turns off the light source 21 and causes the image sensor 35 to perform imaging processing. The image processing circuit 119 generates the black generation data based on the result of the imaging processing, and stores the black reference data in the image processing memory 121. It is noted that the black reference data is generated with respect to each of the RGB components.

Incidentally, in quantizing the imaging data of the gloss reference member 17, default white reference data and black reference data, or latest white reference data and black reference data stored in the image processing memory 121 is used.

Next, the control circuit 115 reads the object 40, and causes the image processing circuit 119 to execute image processing. Specifically, the image processing is performed as follows: In the same manner as in imaging the gloss reference member 17, the control circuit 115 moves the light source 21 by controlling the stepping motor 105, irradiates the object 40 (such as a glossy object) with light having an amount controlled based on the glossy object parameter, and causes the image sensor 35 to image the object 40. Then, the image processing circuit 119 acquires, through the image sensor 35 and the AFE 109, the imaging data of the object 40.

The image processing circuit 119 quantizes the imaging data of the object 40 on the basis of the white reference data and the black reference data to generate image data of the object 40 (through the shading correction). Besides, the image processing circuit 119 subjects the image data of the object 40 to other various image processing (such as γ correction based on γ data stored in the image processing memory 121), and stores image data resulting from the processing in the external memory 103. Incidentally, the exposing part 51 of FIG. 1 irradiates the surface of the photoconductive member 47 with light based on the image data of the object 40. Accordingly, the printing device 4 forms an image on a recording medium on the basis of the image data generated by the image reading device 3.

Next, a case where the ordinary reading mode is selected will be described. In the ordinary reading mode, the image reading device 3 does not execute the processing for controlling the light amount of the light source 21 based on the gloss reference member 17. Accordingly, the light amount control circuit 107 controls the light emitting part 71 of the light source 21 so that a light amount based on a light amount control parameter precedently set for the ordinary reading mode can be employed for the irradiation. The processing for generating white reference data, the processing for acquiring black reference data, the processing for reading the object 40, and the image processing (including the shading correction, the γ correction and the like) are performed in the same manner as in the glossy object reading mode, and hence the description is herein omitted.

As described with reference to FIGS. 1, 2 and 3 so far, in the image reading device 3 of the present embodiment, the image sensor 35 images the gloss reference member 17 with light irradiated from the light source 21 and reflected on the gloss reference member 17 in the glossy object reading mode. Then, the control circuit 115 controls the light amount of the light irradiated from the light source 21 on the basis of an imaging signal obtained by the image sensor 35. The light source 21 irradiates the object 40 with light having an amount controlled by the control circuit 115. The image sensor 35 images the object 40 with the light irradiated from the light source 21 and reflected on the object 40.

According to the present embodiment, in the glossy object reading mode, the gloss reference member 17 is read to control the light amount of the light source 21 before starting reading the object 40, and therefore, the reading operation for the object 40 performed thereafter can be carried out at a time. As a result, the overflow of charge from each pixel of the image sensor 35 can be suppressed, and the lowering of the work efficiency of a user can be suppressed. Besides, hardware for controlling the light amount can be constructed by employing a simple structure of the gloss reference member 17, and hence, the cost can be restrained.

Besides, in the image reading device 3 of the present embodiment, in the glossy object reading mode, the light source 21 irradiates the white reference member 19 with light having an amount controlled by the control circuit 115 on the basis of the gloss reference member 17. Then, the image sensor 35 images the white reference member 19 with light irradiated from the light source 21 and reflected on the white reference member 19. Accordingly, if the object 40 is a glossy object, suitable white reference data can be generated.

[Process Flow in Image Reading Device]

Figure 4:
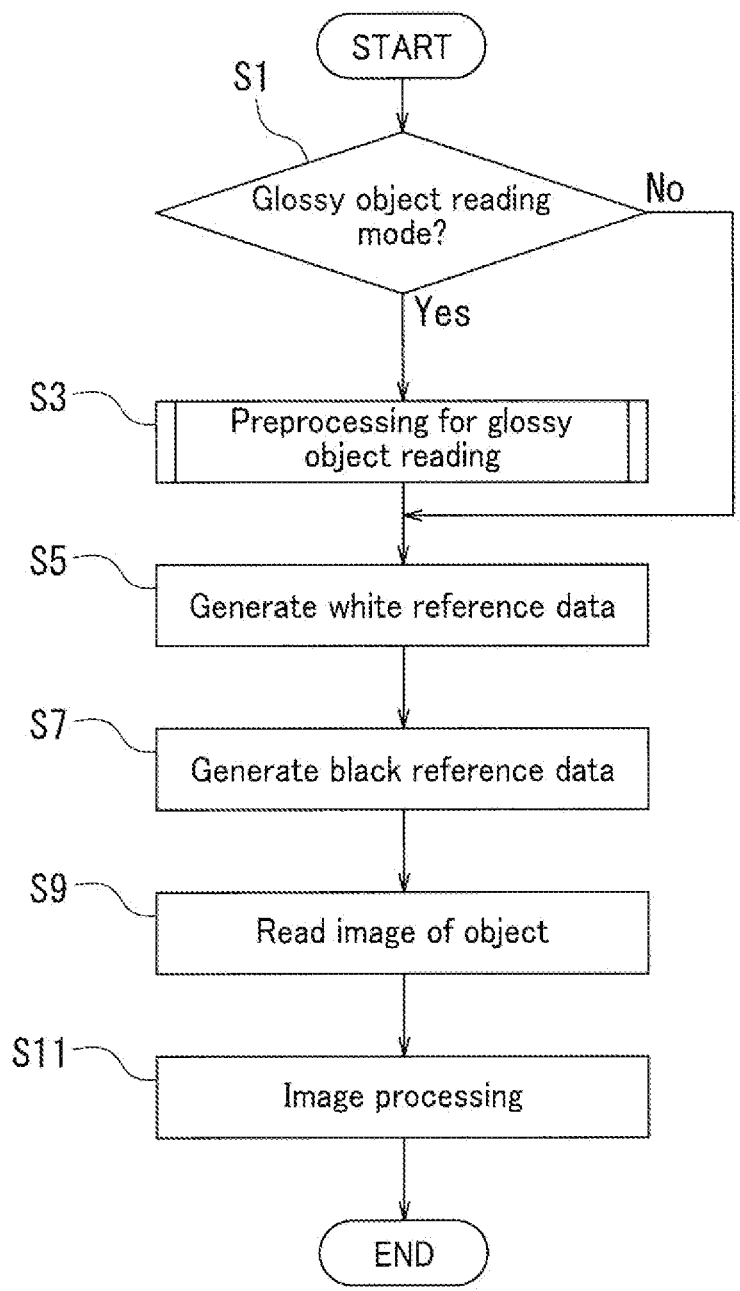
FIG. 4 is a flowchart illustrating processing executed by the image reading device according to the embodiment of the present disclosure.

The process flow will be described with reference to FIGS. 3 and 4. FIG. 4 is a flowchart of a glossy object reading process executed by the image reading device 3. The glossy object reading process is realized by the control circuit 115 executing a computer program stored in the external memory 103 or the internal memory 117. The computer program is one for generating an image of the object 40. The external memory 103 and the internal memory 117 are examples of a non-transitory computer-readable recording medium. The non-transitory computer-readable recording medium may be, for example, a semiconductor memory, an auxiliary storage, or a removable medium.

In step S1, the control circuit 115 determines whether or not the current mode is the glossy object reading mode. If the current mode is the glossy object reading mode (namely, Yes in step S1), the control proceeds to step S3. Procedures in and after step S3 are started when a user presses a start button (not shown) for starting a scanning (or copying) operation.

On the other hand, if the current mode is the ordinary reading mode (namely, No in step S1), the control skips step S3 and proceeds to step S5. Procedures in and after step S5 are started when a user presses the start button for starting a scanning (or copying) operation.

In step S3, the control circuit 115 executes preprocessing for glossy object reading. After completing the preprocessing for glossy object reading, the control proceeds to step S5.

Figure 5:
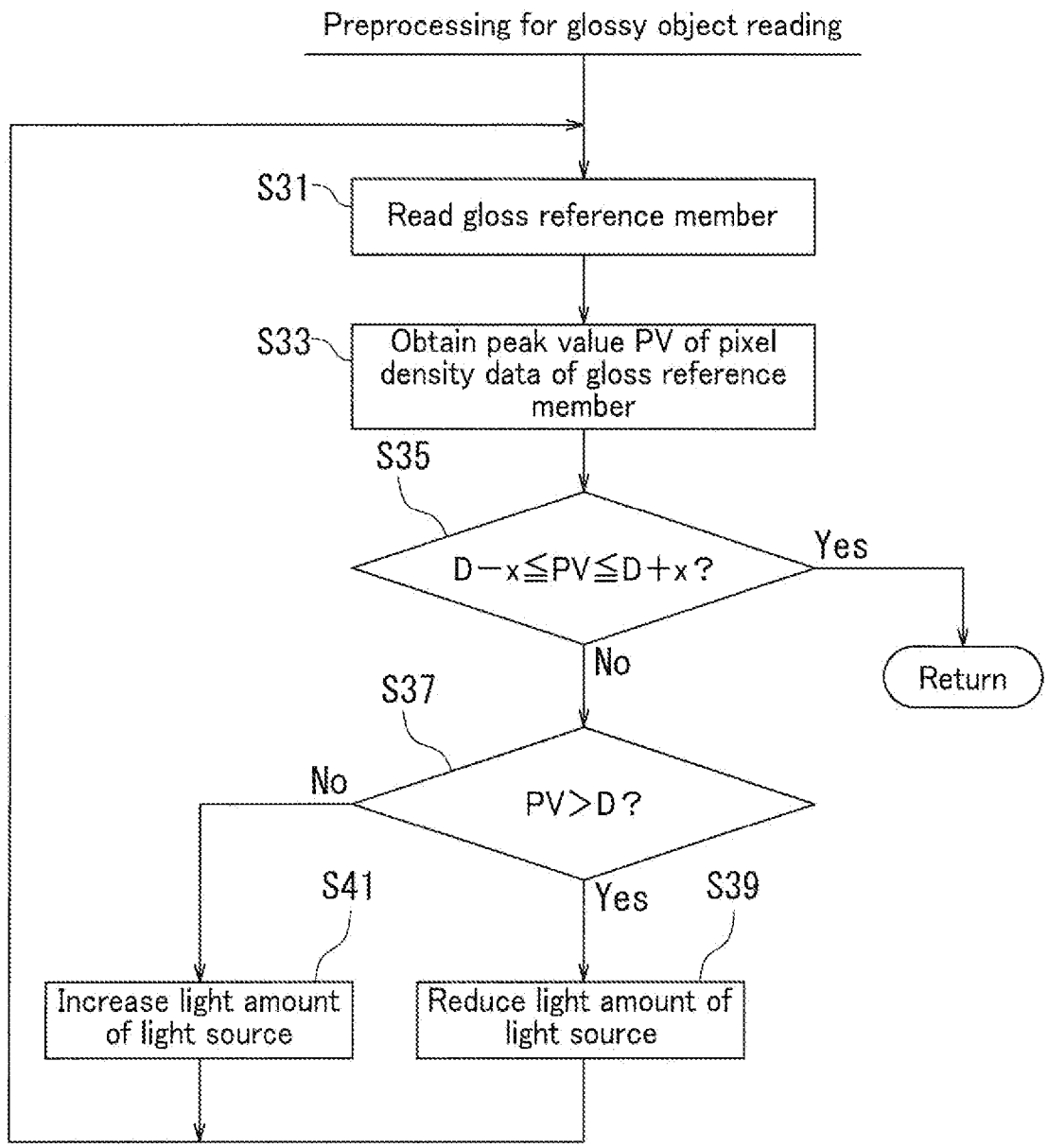
FIG. 5 is a flowchart illustrating preprocessing for glossy object reading according to the embodiment of the present disclosure.

FIG. 5 is a flowchart of the preprocessing for glossy object reading performed in step S3. In step S31, the control circuit 115 reads the gloss reference member 17. Specifically, this procedure is performed as follows: The control circuit 115 controls the stepping motor 105 to move the light source 21, causes the light source 21 to irradiate the gloss reference member 17 with light, and causes the image sensor 35 to image the gloss reference member 17. Then, the control circuit 115 acquires image data of the gloss reference member 17 through the image sensor 35, the AFE 109 and the image processing circuit 119. Incidentally, in step S31 performed for the first time in the loop of the preprocessing for glossy object reading, the control circuit 115 causes the light amount control circuit 107 to control the light amount of the light emitting part 71 of the light source 21 on the basis of an initial value of the light amount control parameter. In step S31 performed for the second time and after, the light emitting part 71 emits light having an amount controlled in step S39 or step S41.

In step S33, the control circuit 115 acquires pixel density data corresponding to a peak value (maximum value) PV out of pixel density data included in the image data of the gloss reference member 17. In step S35, the control circuit 115 determines whether or not the peak value PV falls in a prescribed range, namely, whether or not the peak value PV is a first prescribed value (D−x) or more and a second prescribed value (D+x) or less. If it is determined that the peak value PV falls in the prescribed range (namely, Yes in step S35), the control circuit 115 defines the current light amount control parameter as the glossy object parameter, stores the glossy object parameter in the internal memory 117, and terminates the preprocessing for glossy object reading. Thereafter, the control proceeds to step S5 of FIG. 4.

On the other hand, if it is determined that the peak value PV is out of the prescribed range (namely, No in step S35), the control proceeds to step S37. In step S37, the control circuit 115 determines whether or not the peak value PV exceeds a specified density value D. If it is determined that the peak value PV exceeds the specified density value D (namely, Yes in step S37), the control proceeds to step S39. On the other hand, if it is determined that the peak value PV does not exceed the specified density value D (namely, No in step S37), the control proceeds to step S41.

In step S39, the control circuit 115 executes processing for reducing the light amount of the light emitting part 71 of the light source 21. Specifically, this procedure is performed as follows: The control circuit 115 resets the light amount control parameter so as to reduce the light amount of the light emitting part 71, and stores this light amount control parameter in the internal memory 117. In other words, the control circuit 115 shortens the lighting period corresponding to the light amount control parameter by a prescribed time period tf. The prescribed time period tf is experimentally and/or experientially determined. Then, the control circuit 115 controls the light amount control circuit 107 for reducing the light amount of the light emitting part 71 on the basis of the light amount control parameter thus reset.

On the other hand, in step S41, the control circuit 115 executes processing for increasing the light amount of the light emitting part 71. Specifically, this procedure is performed as follows: The control circuit 115 resets the light amount control parameter so as to increase the light amount of the light emitting part 71, and stores this light amount control parameter in the internal memory 117. In other words, the control circuit 115 elongates the lighting period corresponding to the light amount control parameter by the prescribed time period tf. Then, the control circuit 115 controls the light amount control circuit 107 for increasing the light amount of the light emitting part 71 of the light source 21 on the basis of the light amount control parameter thus reset.

In this manner, the control circuit 115 repeats the procedures of steps S31 to S41 until the peak value PV falls in the prescribed range (namely, Yes in step S35), so as to set, as the glossy object parameter, the light amount control parameter corresponding to the peak value PV falling in the prescribed range, and stores the glossy object parameter in the internal memory 117. Then, the control proceeds to step S5 of FIG. 4.

Referring to FIGS. 3 and 4 again, the glossy object reading process will be continuously described. In step S5, the control circuit 115 reads the white reference member 19 to generate white reference data. Specifically, the control circuit 115 controls the light source 21 to irradiate the white reference member 19 with light having an amount controlled on the basis of the glossy object parameter. Then, the control circuit 115 controls the image sensor 35 to image the white reference member 19, and further controls the image processing circuit 119 to generate white reference data. In step S7, the control circuit 115 controls the light source 21 to be turned off, and controls the image processing circuit 119 to generate black reference data.

In step S9, the control circuit 115 reads the object 40 (such as a glossy object) and acquires imaging data of the object 40. This procedure is specifically performed as follows: The control circuit 115 controls the light source 21 to irradiate the object 40 with light having an amount controlled on the basis of the glossy object parameter. Then, the control circuit 115 controls the image sensor 35 to image the object 40, and acquires the imaging data of the object 40 through the AFE 109.

In step S11, the control circuit 115 controls the image processing circuit 119 to generate image data on the basis of the imaging data of the object 40, and further controls the image processing circuit 119 to execute image processing on the image data. The image processing circuit 119 stores image data resulting from the image processing in the external memory 103. The image processing is, for example, the shading correction, the γ correction, or adjustment of RGB balance described later. The control circuit 115 displays, in the operation panel 104, an image based on the image data resulting from the image processing. Then, in response to an instruction issued by a user through the operation panel 104, the control circuit 115 outputs the image (specifically, prints the image or outputs the image as an image file).

Thereafter, the control circuit 115 restores the light amount of the light source 21 to the light amount precedently set for the ordinary reading mode, and sets the mode to the ordinary reading mode. In other words, the control circuit 115 sets the light amount control parameter to a value precedently set for the ordinary reading mode, and sets the mode to the ordinary reading mode. Alternatively, the control circuit 115 executes light amount control using the white reference member 19 in the same manner as in the light amount control using the gloss reference member 17 (namely, the procedures of steps S3 of FIG. 4 and FIG. 5), and sets the mode to the ordinary reading mode. In this case, a value set for the ordinary reading mode is used as the specified density value D employed in step S35 and S37 of FIG. 5. Incidentally, the light amount control parameter employed in the ordinary reading mode may be secured to a constant value.

On the other hand, the procedures in step S5 to step S11 performed in the ordinary reading mode are similar to those of step S5 to step S11 performed in the glossy object reading mode except for the light amount of the light emitting part 71 of the light source 21, and hence the description is herein omitted.

In this manner, the computer program of the present embodiment causes the control circuit 115, that is, a computer, to execute the procedure for causing the image sensor 35 to image the gloss reference member 17 irradiated with light from the light source 21 (step S31) and the procedures for controlling the light amount of the light source 21 on the basis of the imaging signal obtained by the image sensor 35 (steps S33 to S41).

As a result, when the object is a glossy object, there is no need to repeatedly perform a reading operation for the object, and the overflow of charge from each pixel (each light receiving element) of the image sensor 35 can be suppressed and the lowering of the work efficiency of a user can be suppressed.

Besides, the computer program of the present embodiment further causes the control circuit 115 to execute the procedure for generating white reference data based on the white reference member 19 by irradiating the white reference member 19 with the light having an amount controlled based on the gloss reference member 17 (step S5). Accordingly, white reference data can be generated on the basis of the light having an amount controlled suitably to the case where the object 40 is a glossy object. As a result, an image of the glossy object with higher quality can be generated.

[Adjustment of RGB Balance]

Next, the adjustment process for RGB balance will be described as an example of the image processing performed in step S11 of FIG. 4. The adjustment of RGB balance is executed together with the shading correction. Each pixel data included in the imaging data output by the AFE 109 includes RGB components. Here, the R component, the G component, and the B component are respectively designated as R component data, G component data, and B component data. In the ordinary reading mode, if the R component data of the pixel data exceeds white reference data of the R component, the image processing circuit 119 sets the R component data to a limit value of the density data corresponding to white (corresponding to pure white=255), and thus sets the R component of the pixel density data. With respect to the G component and the B component, the image processing circuit 119 performs similar processing.

In the glossy object reading mode, however, the image processing circuit 119 executes the adjustment of RGB balance as follows: Although the light amount of the light source 21 is controlled on the basis of the gloss reference member 17, depending on the glossy object used as the object 40, all or a part of the R component data, the G component data, and the B component data of the pixel data included in the imaging data may exceed the white reference data in some cases. Therefore, if one or two of the R component data, the G component data, and the B component data of the pixel data included in the imaging data exceed threshold data Th (for example, the white reference data), the image processing circuit 119 sets the R component data, the G component data, and the B component data of the corresponding pixel data to the limit value of the density data corresponding to white (corresponding to pure white=255), and thus sets the R component, the G component, and the B component of the pixel density data. As a result, the RGB balance is adjusted, so as to generate an image of the glossy object (the object 40) with a little uncomfortable feeling. The reason will now be described with reference to FIG. 6.

Figure 6A:
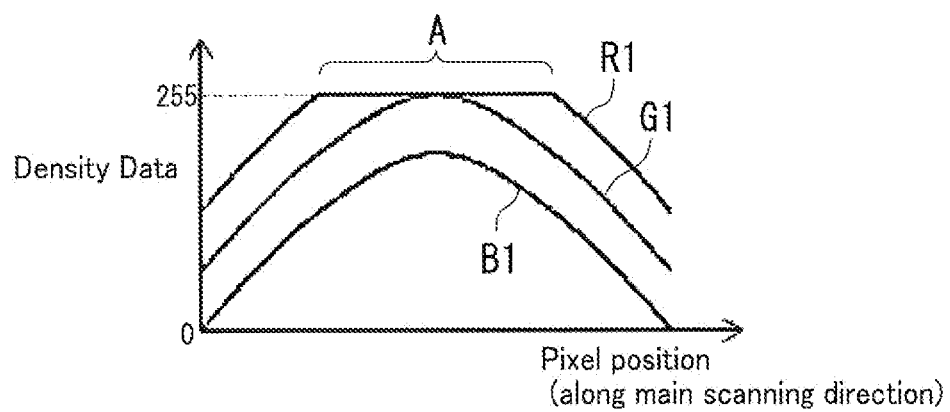
FIG. 6A is an explanatory diagram of pixel density data not adjusted in RGB balance.
Figure 6B:
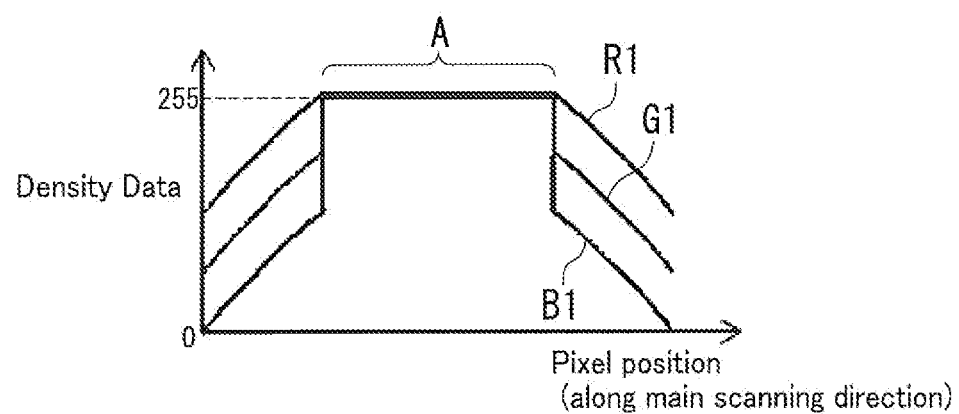
FIG. 6B is an explanatory diagram of pixel density data adjusted in RGB balance.

FIG. 6A is an explanatory diagram of pixel density data in which the RGB balance is not adjusted. FIG. 6B is an explanatory diagram of pixel density data in which the RGB balance is adjusted. In FIGS. 6A and 6B, the abscissa indicates positions of pixels linearly arranged along the main scanning direction in the image sensor 35, and the ordinate indicates density data corresponding to each of the RGB components included in the pixel density data. A curve R1, a curve G1, and a curve B1 respectively correspond to density data of the R component of the pixel density data, density data of the G component, and density data of the B component. As illustrated in FIG. 6A, in pixel density data corresponding to pixels disposed in a region A, density data corresponding to the R component is saturated. On the other hand, density data corresponding to the G component and the B component is not saturated.

If density data of one or two of the RGB components is saturated, color balance is lost, and hence, an image of the read glossy object (the object 40) may give an uncomfortable feeling in some cases. Therefore, as illustrated in FIG. 6B, all the RGB components of the pixel density data corresponding to the pixels disposed in the region A are set to the limit value of the density data corresponding to white. Since the limit value of the density data corresponding to white indicates a state close to gloss, the RGB balance is adjusted by setting all the RGB components to the limit value, so that the uncomfortable feeling otherwise caused in the image of the glossy object (the object 40) can be restrained.

As described so far, in the present embodiment, if at least one color component data out of the R component data, the G component data, and the B component data exceeds the threshold data Th, the image processing circuit 119 executes the adjustment of RGB balance by setting the R component data, the G component data, and the B component data to the limit value of the density data corresponding to white.

[Alternative Example of Gloss Reference Member]

Figure 7:
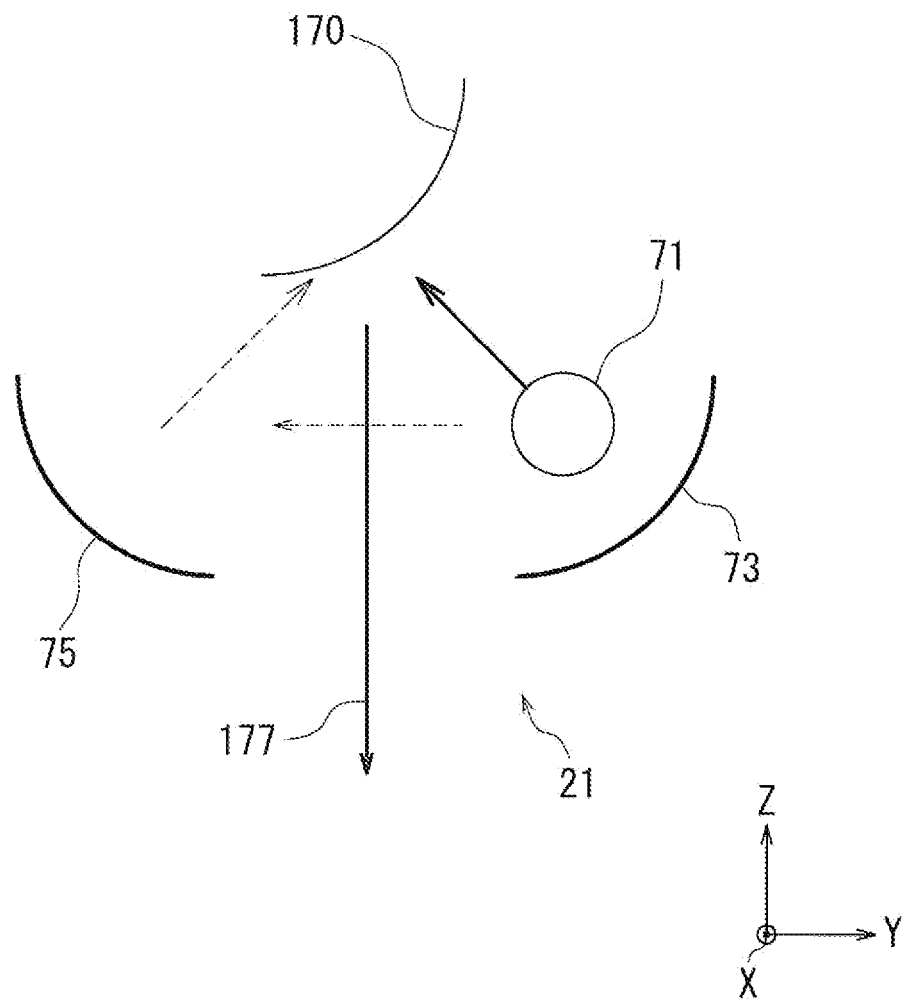
FIG. 7 is a schematic diagram of another example of the gloss reference member according to the embodiment of the present disclosure.

FIG. 7 is a schematic diagram of an alternative example of the gloss reference member 17 of the present embodiment. A gloss reference member 170 of this example is formed as a part of a spherical shape smaller than a hemisphere. Besides, the gloss reference member 170 is in a shape curved downward obliquely to the vertical line.

The gloss reference member 170 has a surface reflecting, in the normal direction to the plane where the object 40 is loaded (in the vertical direction in the present embodiment), light directly entering from the light emitting part 71, light entering from the reflecting member 73, and light entering from the reflecting member 75. In reflected light 177 from the gloss reference member 170, mirror reflected light is smaller in the amount than in the reflected light 77 from the gloss reference member 17 described with reference to FIG. 2. However, the gloss reference member 170 reflects, in the vertical direction, light entering from the two directions. Accordingly, as compared with reflected light of light entering from one direction, the reflected light 177 can attain higher intensity.

The gloss reference member 170 having a crescent cross-section is formed to be convex toward the light emitting part 71. As another example of the gloss reference member, the gloss reference member 170 may be formed to be convex toward the reflecting member 75.

The gloss reference member 170 is formed to have a larger ratio of mirror reflected light to incident light than the white reference member 19 by, for example, polishing a metal, or plating a synthetic resin or glass. The gloss reference member 170 may be hollow or may include another structure.

As described so far, according to the present embodiment, the gloss reference member 170 is in a curved shape. Accordingly, a surface for reflecting, in the vertical direction, light irradiated from the light emitting part 71, the reflecting member 73, and the reflecting member 75 can be simply formed. Besides, the gloss reference member 170 is in a part of a spherical surface. Accordingly, the cost can be reduced and the space can be saved similarly to the gloss reference member 17.

Besides, the gloss reference member 170 has the surface for reflecting, in the vertical direction, the light irradiated from the light emitting part 71 and the light irradiated from the reflecting member 75 in the different direction from the light emitting part 71. Accordingly, the image sensor 35 can receive reflected light with high intensity from the gloss reference member 170. As a result, when the object 40 is a glossy object, the overflow of charge from each pixel of the image sensor 35 can be effectively suppressed.

[Alternative Examples of Light Source]

Figure 8A:
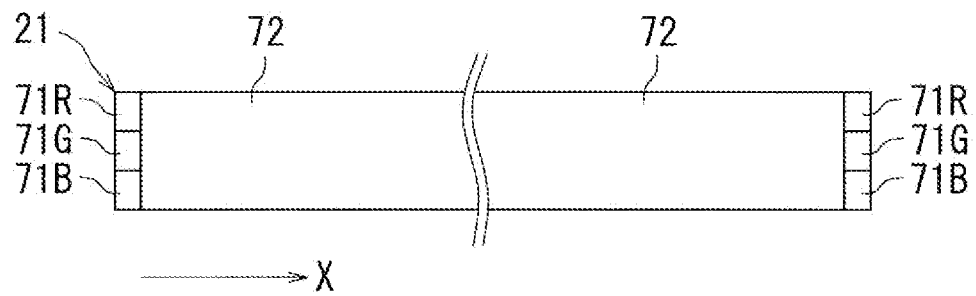
FIG. 8A is a schematic diagram of another example of the light source according to the embodiment of the present disclosure.
Figure 8B:
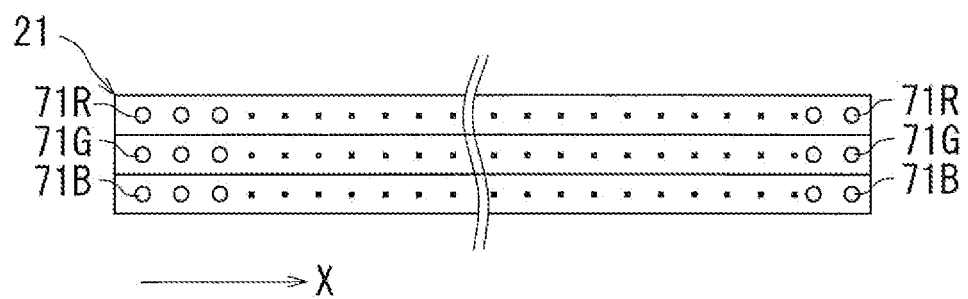
FIG. 8B is a schematic diagram of still another example of the light source according to the embodiment of the present disclosure.

FIGS. 8A and 8B are schematic diagrams illustrating alternative examples of the light source 21 of one embodiment of the present disclosure. The light source 21 of the alternative example includes an LED 71R (light emitting part) for emitting light of an R (red) component, an LED 71G (light emitting part) for emitting light of a G (green) component, and an LED 71B (light emitting part) for emitting light of a B (blue) component. The light source 21 of the alternative example is used instead of the light source 21 of FIG. 2.

In the light source 21 of FIG. 8A, the LED 71R, the LED 71G, and the LED 71B are provided at both ends of a light guide 72. The light guide 72 extends in the main scanning direction (along the X-axis direction) to guide the light from the LED 71R, the LED 71G, and the LED 71B. The light from the LED 71R, the LED 71G, and the LED 71B is irradiated linearly uniformly onto the gloss reference member 17, the white reference member 19 or the object 40, using the light guide 72. Incidentally, the LED 71R, the LED 71G, and the LED 71B may be provided at merely one end of the light guide 72.

In the light source 21 of FIG. 8B, the LEDs 71R, the LEDs 71G and the LEDs 71B are arranged each along the main scanning direction (along the X-axis direction).

If the image reading device 3 includes the light source 21 of FIG. 8A or 8B, there is no need to use a color filter for the color separation of the reflected light before it is input to the image sensor 35. For example, the LED 71R, the LED 71G, and the LED 71B emit light respectively at different timings, so that the image sensor 35 can receive reflected light of the R component, reflected light of the G component, and reflected light of the B component respectively at different timings. In this case, there is no need to provide, in the image sensor 35, pixels (light receiving elements) respectively correspondingly to the RGB components.

If the control circuit 115 controls the light amount of the light source 21 on the basis of the gloss reference member 17, the glossy object parameter is set with respect to each of the LED 71R, the LED 71G, and the LED 71B, so as to respectively control the light amounts of the LED 71R, the LED 71G, and the LED 71B. Accordingly, the control circuit 115 executes the processing of FIG. 5 on each of the R component, the G component, and the B component of the pixel density data. In other words, on the basis of imaging signals corresponding to the different colors (R, G and B) of the gloss reference member 17 obtained by the image sensor 35, the control circuit 115 controls the light amounts of the LED 71R, the LED 71G, and the LED 71B respectively corresponding to the different colors. As a result, when the object 40 is a glossy object, the overflow of charge in each pixel of the image sensor 35 can be suppressed with respect to each of the different colors.

It is noted that the present disclosure is not limited to the aforementioned embodiment but can be practiced in various embodiments without departing from the scope of the present disclosure. For example, the following modifications can be made. In the following description, the gloss reference member according to the embodiment of the present disclosure including the gloss reference member 17 and the gloss reference member 170 is generically designated as the "gloss reference member M".

(1) The gloss reference member M is formed as a part of a spherical shape smaller than a hemisphere in the examples shown in FIGS. 2 and 7. The shape of the gloss reference member M is, however, not limited to these exemplified shapes. For example, the gloss reference member M is in a curved shape. The curved shape is, for example, a spherical shape, a hemispherical shape, or a spherical shape larger than a hemisphere. For example, the curved shape is a cylindrical shape, a semi-cylindrical shape, or a shape obtained by cutting a cylinder on a plane along the central line of the cylinder. In such a case, the gloss reference member M is formed to extend along the main scanning direction.

(2) In the embodiment described with reference to FIG. 3, the light amount control parameter used for controlling the light amount of the light emitting part 71 is exemplarily described as the lighting period of the light emitting part 71. The light amount control parameter is, however, not limited to the lighting period. The light amount control parameter is, for example, a current value of a current supplied to the light emitting part 71. Specifically, the control circuit 115 controls the light amount by controlling the current value of the current supplied to the light emitting part 71. As the current value is larger, the light amount of the light emitting part 71 is increased, and as the current value is smaller, the light amount of the light emitting part 71 is decreased. If the current value is used as the light amount control parameter, the lighting period of the light emitting part 71 is, for example, secured to a constant value. Alternatively, the light amount control parameter is, for example, both the lighting period of the light emitting part 71 and the current value of the current supplied to the light emitting part 71.

(3) The length of the gloss reference member M along the main scanning direction is smaller than the length, along the main scanning direction, of an object loading surface in the exemplified cases of FIGS. 2 and 7. The object loading surface refers to a region on the surface of the contact glass 15 on which the object 40 can be read. On the other hand, the length along the main scanning direction of each of the mirror 23, the mirror 27, and the mirror 29 is equivalent to or slightly larger than the length along the main scanning direction of the object loading surface. Accordingly, the image sensor 35 images even a region where the gloss reference member M is not present in imaging the gloss reference member M. As a result, the imaging signal output by the image sensor 35 includes a large number of pixel signals not involving the image of the gloss reference member M.

Therefore, the control circuit 115 may control the light amount of the light emitting part 71 of the light source 21 on the basis of a part of the imaging signal obtained by the image sensor 35 corresponding to a prescribed region including the image of the gloss reference member M. As a result, the throughput of the control circuit 115 can be reduced.

Alternatively, if the light source 21 of FIG. 8B is used as the light source 21, out of all the LEDs 71R, the LEDs 71G, and the LEDs 71B, merely LEDs 71R, LEDs 71G, and LEDs 71B disposed in a region where the gloss reference member M is present can be turned on. As a result, power consumption can be reduced.

Furthermore, in scanning the gloss reference member M in the opposite direction to the sub scanning direction, instead of scanning the whole region where the gloss reference member M is present, merely a region along the sub scanning direction in which the image sensor 35 can receive the mirror reflected light 77 or the reflected light 177 with high intensity from the gloss reference member M may be scanned. As a result, a scanning time for the gloss reference member M can be shortened.

(4) In the exemplified case of FIG. 1, the gloss reference member M is positioned so that the white reference member 19 can be sandwiched between the gloss reference member M and the contact glass 15. The position of the gloss reference member M is, however, not limited to that illustrated in FIG. 1. The gloss reference member M may be positioned, for example, between the white reference member 19 and the contact glass 15.

(5) The control circuit 115 of FIG. 3 may cause the light amount control circuit 107 to control the light amount of the light irradiated from the light emitting part 71 of the light source 21 in accordance with an input by a user through the operation panel 104. For example, the control circuit 115 executes the following control: In the glossy object reading mode, the control circuit 115 displays, on the operation panel 104, an image based on the image data resulting from the image processing performed in step S11 of FIG. 4. This image data is based on the imaging signal obtained by the image sensor 35 after controlling the light amount. Then, a user sees the image displayed on the operation panel 104, and inputs a light amount control parameter through the operation panel 104. The control circuit 115 causes the light amount control circuit 107 to control the light amount of light irradiated from the light source 21 on the basis of the light amount control parameter thus input by the user. Then, the control circuit 115 causes the image sensor 35 to image the object 40 (such as a glossy object) to obtain image data.

In this manner, the control circuit 115 controls the light amount of the light irradiated from the light source 21 on the basis of the imaging signal obtained by the image sensor 35, and thereafter, controls the light amount of the light irradiated from the light source 21 in accordance with an input by a user. As a result, the light amount can be finely adjusted, and a suitable light amount can be set in accordance with an individual object 40.

(6) In the exemplified case of FIGS. 3 to 5, the control circuit 115 controls the stepping motor 105, the light amount control circuit 107, the image sensor 35, the AFE 109, and the operation panel 104. These components are, however, not necessary to be controlled by one control circuit (computer) but may be controlled by a plurality of control circuits (computers). Besides, although the control circuit 115 and the image processing circuit 119 are mounted on the same chip in the above-described embodiment, they may be formed on different chips. In other words, the present disclosure does not depend on whether hardware is dispersedly formed or integrally formed. Furthermore, in the exemplified case of FIG. 3, the image processing circuit 119 is operated under control of the control circuit 115. The image processing circuit 119 may execute, however, a computer program so as to perform the image processing while appropriately communicating with the control circuit 115. Besides, although the control circuit 115 controls the operation of the printing device 4 in the above-described embodiment, a control circuit (computer) for controlling the printing device 4 may be separately provided.

(7) The order of performing the respective steps of FIGS. 4 and 5 is not especially limited unless the order is particularly specified.

(8) Although a color image of the object 40 is obtained in the image reading device 3 of the present embodiment by using a color filter (not shown) or the LED 71R, the LED 71G, and the LED 71B (see, for example, FIG. 8A or 8B), the application of the present disclosure is not limited to a case of reading a color image. Without using a color filter, and the LED 71R, the LED 71G, and the LED 71B, the image reading device 3 may obtain a monochrome image of the object 40.

(9) The image reading device 3 employs, as the image sensor 35, a CCD system using a CCD. As the image sensor 35, however, a CIS (Contact Image Sensor) system using a CMOS image sensor may be employed.

(10) The image forming apparatus 1 is not limited to a copying machine. The image forming apparatus 1 can be, for example, a multifunction peripheral having functions of a copying machine, a printer, and/or a facsimile machine, or a printer or a facsimile machine. The image reading device 3 can be used as a scanner alone.

(11) The present disclosure is applicable in the field of image reading devices capable of reading an image of a three-dimensional object, and image forming apparatuses including the image reading device as a component.

What is claimed is:

1. An image reading device for reading an image of an object, comprising:
    a white reference member used for generating white reference data;
    a gloss reference member having a larger ratio of mirror reflected light to incident light than the white reference member;
    a light source configured to irradiate light;
    an image sensor configured to image the gloss reference member with light irradiated from the light source and reflected on the gloss reference member; and
    a control unit configured to control a light amount of the light irradiated from the light source based on an imaging signal obtained by the image sensor such that peak density data out of all pixel density data included in image data obtaining by imaging the gloss reference member falls within a prescribed density range,
    wherein after the control unit controls the light amount, the light source irradiates the white reference member with light having the light amount.

2. An image reading device according to claim 1, wherein the gloss reference member has a surface for mirror reflecting incident light along a normal direction to a surface where the object is loaded.

3. An image reading device according to claim 1, wherein the gloss reference member is in a curved shape.

4. An image reading device according to claim 3, wherein the gloss reference member is formed as a part of a spherical shape smaller than a hemisphere.

5. An image reading device according to claim 4, wherein the gloss reference member is in a shape curved downward in a vertical direction.

6. An image reading device according to claim 4, wherein the gloss reference member is in a shape curved downward obliquely to a vertical line.

7. An image reading device according to claim 3, wherein the gloss reference member is in a semi-cylindrical shape or a shape obtained by cutting a cylinder on a plane along a central axis of the cylinder.

8. An image reading device according to claim 1, wherein the control unit controls the light amount of the light irradiated from the light source in accordance with an input by a user after controlling the light amount of the light irradiated from the light source based on the imaging signal obtained by the image sensor.

9. An image reading device according to claim 1, wherein the image sensor images the white reference member with light irradiated from the light source and reflected on the white reference member,
    the light source irradiates the object with light having an amount controlled by the control unit, and
    the image sensor images the object with light irradiated from the light source and reflected on the object.

10. An image reading device according to claim 1, wherein
    the light source includes a plurality of light emitting parts respectively configured to emit light of different colors, and
    the control unit controls a light amount of each of the light emitting parts respectively corresponding to the different colors based on the imaging signal obtained with respect to each of the different colors by the image sensor.

11. An image reading device according to claim 1, further comprising an image processing unit,
    wherein the light source irradiates the object with light having an amount controlled by the control unit,
    the image sensor images the object with light irradiated from the light source and reflected on the object,
    the imaging signal involving an image of the object obtained by the image sensor includes a plurality of pixel signals, and
    if at least one of a plurality of color component data corresponding to a plurality of color components included in the pixel signals exceeds threshold data, the image processing unit sets the plurality of color component data to a limit value of density data corresponding to white.

12. An image reading device according to claim 1, wherein
    the control unit controls the light amount by controlling a lighting period of a light emitting part of the light source, and/or a current value of a current supplied to the light emitting part.

13. An image forming apparatus, comprising:
    an image reading device according to claim 1; and
    an image forming section configured to form the image of the object.

14. A non-transitory computer-readable recording medium having recorded thereon a computer program for generating an image of an object, the computer program causing a computer to execute:
    causing an image sensor to image a gloss reference member irradiated with light irradiated from a light source; and
    controlling a light amount of the light source based on an imaging signal obtained by the image sensor such that peak density data out of all pixel density data included in image data obtaining by imaging the gloss reference member falls within a prescribed density range,
    wherein the gloss reference member has a larger ratio of mirror reflected light to incident light than a white reference member used for generating white reference data, and
    after controlling the light amount of the light source, irradiating the white reference member with light having the light amount.

* * * * *